US012704227B2

(12) United States Patent
Lee

(10) Patent No.: US 12,704,227 B2
(45) Date of Patent: Aug. 11, 2026

(54) PRESSURE VESSEL

(71) Applicants: Hyundai Motor Company, Seoul (KR); Kia Corporation, Seoul (KR)

(72) Inventor: Kwan Ho Lee, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 119 days.

(21) Appl. No.: 18/182,520

(22) Filed: Mar. 13, 2023

(65) Prior Publication Data

US 2024/0151363 A1 May 9, 2024

(30) Foreign Application Priority Data

Nov. 8, 2022 (KR) .......................... 1020220148152

(51) Int. Cl.
*F17C 11/00* (2006.01)

(52) U.S. Cl.
CPC .... *F17C 11/005* (2013.01); *F17C 2201/0109* (2013.01); *F17C 2201/032* (2013.01); *F17C 2203/0604* (2013.01); *F17C 2203/0619* (2013.01); *F17C 2203/0658* (2013.01); *F17C 2205/0305* (2013.01); *F17C 2205/0338* (2013.01); *F17C 2221/012* (2013.01)

(58) Field of Classification Search
CPC ........ F17C 2201/0109; F17C 2201/032; F17C 2203/0604; F17C 2203/0619; F17C 2203/0658; F17C 2205/0305; F17C 2205/0338; F17C 2221/012; F17C 11/005; F17C 2270/0763; F17C 2260/042; F17C 2250/0439
USPC .......................................................... 220/592
See application file for complete search history.

(56) References Cited

U.S. PATENT DOCUMENTS

| | | | | | |
|---|---|---|---|---|---|
| 4,690,295 | A * | 9/1987 | Wills | F17C 1/16 | 220/203.08 |
| 5,848,604 | A * | 12/1998 | Eihusen | F16K 17/383 | 137/72 |
| 8,783,504 | B2 * | 7/2014 | Kleschinski | F17C 13/06 | 428/36.3 |
| 2016/0109065 | A1 * | 4/2016 | Coors | F17C 1/00 | 156/185 |
| 2017/0343162 | A1 * | 11/2017 | Yersak | F17C 13/083 | |
| 2019/0226641 | A1 * | 7/2019 | Ogiwara | F17C 13/12 | |
| 2020/0365917 | A1 * | 11/2020 | Ham | F16K 17/38 | |

FOREIGN PATENT DOCUMENTS

| | | | | |
|---|---|---|---|---|
| CN | 111902307 A * | 11/2020 | B60K 15/063 |
| DE | 102017223652 A1 * | 6/2019 | |
| DE | 102018202742 A | 8/2019 | |

(Continued)

*Primary Examiner* — Nathan J Jenness
*Assistant Examiner* — Madison L Poos
(74) *Attorney, Agent, or Firm* — Fish & Richardson P.C.

(57) ABSTRACT

A pressure vessel includes a liner configured to store a target fluid and including a boss provided at an end thereof, a reinforcement layer surrounding a periphery of the liner, and a thermal conduction member provided between the liner and the reinforcement layer and having a first end in contact with the boss and a second end in contact with the liner at a target position. The thermal conduction member is configured to transfer heat applied to the boss to the target position, thereby obtaining an advantageous effect of improving safety and reliability.

17 Claims, 6 Drawing Sheets

(56) References Cited

FOREIGN PATENT DOCUMENTS

| | | | | | |
|---|---|---|---|---|---|
| EP | 3583346 | A | | 12/2019 | |
| JP | 2018135970 | A | * | 8/2018 | ................ F17C 1/00 |
| WO | WO 2018149772 | A1 | | 8/2018 | |

* cited by examiner

PRESSURE VESSEL

CROSS-REFERENCE TO RELATED APPLICATION

This application claims priority to and the benefit of Korean Patent Application No. 10-2022-0148152, filed in the Korean Intellectual Property Office, on Nov. 8, 2022, the entire contents of which are incorporated herein by reference.

TECHNICAL FIELD

The present disclosure relates to a pressure vessel, and more particularly, to a pressure vessel capable of improving safety and reliability.

BACKGROUND

A fuel cell electric vehicle (FCEV) produces electrical energy from an electrochemical reaction between oxygen and hydrogen in a fuel cell stack and uses the electrical energy as a power source.

The fuel cell electric vehicle may continuously generate electricity, regardless of a capacity of a battery, by being supplied with fuel and air from the outside, and thus has high efficiency, and emits almost no contaminant. By virtue of these advantages, continuous research and development is being conducted on the fuel cell electric vehicle.

The fuel cell electric vehicle is equipped with a hydrogen tank configured to store hydrogen. The hydrogen stored in the hydrogen tank may be supplied to a fuel cell stack along a hydrogen supply line and used to produce electrical energy.

A TYPE 4 pressure vessel may be used as the hydrogen tank of a hydrogen vehicle. The TYPE 4 pressure vessel includes a liner (made of a nonmetallic material, for example), and a reinforcement layer made by winding a carbon fiber composite material around an outer surface of the liner.

In some cases, a thermally activated pressure relief device (TPRD) is provided in an outlet of the hydrogen tank (e.g., a boss provided at an end of the hydrogen tank) and serves to forcibly discharge hydrogen to the outside when a temperature of the hydrogen tank is raised (e.g., a temperature is raised because of a fire).

In some cases, where the thermally activated pressure relief device (TPRD) erroneously operates, when a temperature of the hydrogen tank is raised, the hydrogen tank may burst because the hydrogen may not be forcibly discharged to the outside of the hydrogen tank even though the temperature of the hydrogen tank is raised.

Therefore, recently, various studies have been conducted to prevent the burst of the hydrogen tank by forcibly discharging hydrogen from the hydrogen tank even though the thermally activated pressure relief device is broken down or erroneously operated, but the study results are still insufficient. Accordingly, there is a need to develop a technology to prevent the burst of the hydrogen tank by forcibly discharging hydrogen from the hydrogen tank even though the thermally activated pressure relief device is broken down or erroneously operated.

SUMMARY

The present disclosure has been made in an effort to provide a pressure vessel capable of improving safety and reliability.

In particular, the present disclosure has been made in an effort to locally melt a portion of the liner at a target position on a liner by using heat applied to a boss when a temperature of the pressure vessel is raised, thereby forcibly discharging hydrogen before a reinforcement layer bursts.

Among other things, the present disclosure has been made in an effort to prevent a burst of the pressure vessel by forcibly discharging hydrogen from the pressure vessel even though the thermally activated pressure relief device (TPRD) is broken down or erroneously operated.

The present disclosure has also been made in an effort to reduce a risk of occurrence of a safety accident caused by a burst of a pressure vessel.

According to one aspect of the subject matter described in this application, a pressure vessel includes: a liner configured to store a target fluid and including one or more bosses provided at ends thereof; a reinforcement layer configured to surround a periphery of the liner; and a thermal conduction member provided between the liner and the reinforcement layer and having one end being in contact with the boss and the other end being in contact with the liner at a preset target position, the thermal conduction member being configured to transfer heat applied to the boss to the target position.

This is to improve safety and reliability of the pressure vessel.

That is, a thermally activated pressure relief device (TPRD) is provided in the pressure vessel and configured to forcibly discharge hydrogen to the outside when a temperature of the pressure vessel is raised by a fire or the like. In case that the thermally activated pressure relief device (TPRD) erroneously operates, there occurs a problem in that the pressure vessel bursts because the hydrogen may not be forcibly discharged to the outside of the pressure vessel even though the temperature of the pressure vessel is raised. Further, there is a problem in that a safety accident occurs because of a burst of the pressure vessel.

In some implementations, a portion of the liner at the target position on the liner may be locally melted by using heat applied to the boss when a temperature of the pressure vessel is raised, such that a hole through which the hydrogen may be discharged may be provided. Therefore, it is possible to obtain an advantageous effect of forcibly discharging hydrogen before the pressure vessel bursts, thereby improving safety and reliability.

In some implementations, the hydrogen may be forcibly discharged from the pressure vessel even though the thermally activated pressure relief device (TPRD) is broken down or erroneously operated. Therefore, it is possible to obtain an advantageous effect of preventing the reinforcement layer from bursting before a temperature of the liner is raised. Further, it is possible to obtain an advantageous effect of reducing a risk of occurrence of a safety accident caused by a burst of the reinforcement layer.

The liner may have various structures in accordance with conditions and design specifications.

For instance, the liner may include a cylinder part and dome-shaped side parts respectively provided at two opposite ends of the cylinder part, and the boss may be connected to the side part.

In some implementations, the bosses may include: a first boss provided at one end of the liner; and a second boss provided at the other end of the liner.

The boss may have various structures in accordance with conditions and design specifications.

For instance, the boss may include a neck portion having one end exposed to the outside of the liner, and a flange portion connected to the other end of the neck portion and having a larger cross-sectional area than the neck portion.

In some implementations, the boss may be made of a material having higher thermal conductivity than a material of the liner and a material of the reinforcement layer.

In some implementations, the pressure vessel may include a thermally activated pressure relief device (TPRD) connected to the boss and configured to selectively discharge the target fluid to the outside.

The reinforcement layer may be made of various materials in accordance with conditions and design specifications.

For example, the reinforcement layer may include a carbon fiber layer configured to surround the periphery of the liner.

In another example, in some implementations, the reinforcement layer may include a fiberglass layer configured to surround a periphery of the carbon fiber layer.

The target position on the liner with which the other end of the thermal conduction member is in contact may be variously changed in accordance with conditions and design specifications.

For example, the target position may be defined on the cylinder part of the liner.

This is to minimize the extent to which the boss is strongly separated by the heat transferred from the boss to the liner through the thermal conduction member in the event of a fire. That is, the target position may be defined on the side part of the liner instead of the cylinder part of the liner. However, there may occur a problem in that coupling strength of the boss connected to the side part is difficult to stably maintain when the side part adjacent to the boss is melted. Further, there may occur problems in that as the coupling strength of the boss is decreased, the boss is pulled off and strongly separated from the liner without withstanding an internal pressure of the liner.

In some implementations, the target position may be defined on the cylinder part of the liner, in other words, the point of the liner, which is to be melted by the thermal conduction member, may be defined on the cylinder part. Therefore, it is possible to obtain an advantageous effect of stably maintaining the coupling strength of the boss and inhibiting the separation of the boss.

The number of target positions may be variously changed in accordance with conditions and design specifications.

For example, the target position may be defined in at least any one of a central region of the cylinder part and two opposite edge regions of the cylinder part.

In some implementations, the target position may be defined on the cylinder part, and the other end of the thermal conduction member may be in contact with the cylinder part through the side part.

In some implementations, the thermal conduction member may be provided along a shortest route that connects the boss and the target position. Because the thermal conduction member is provided along the shortest route that connects the boss and the target position as described above, it is possible to maximize the thermal conduction efficiency and heat transfer performance implemented by the thermal conduction member and more quickly melt the portion of the liner at the target position.

The thermal conduction member may have various structures capable of transferring heat applied to the boss to the target position on the liner.

In some implementations, the thermal conduction member may be made of a material having higher thermal conductivity than a material of the reinforcement layer.

In some implementations, the thermal conduction member may include: a first thermal conduction layer having first thermal conductivity and having one end being in contact with the boss and the other end being in contact with the liner at the target position; and a second thermal conduction layer having second thermal conductivity lower than the first thermal conductivity and interposed between the liner and the first thermal conduction layer.

In particular, the second thermal conduction layer may be provided on an inner surface of the first thermal conduction layer that faces the outer surface of the liner, such that the second thermal conduction layer corresponds to a portion between one end of the first thermal conduction layer, which is in contact with the boss, and the other end of the first thermal conduction layer that is in contact with the liner.

As described above, all the remaining portions of the first thermal conduction layer, except for one end and the other end of the first thermal conduction layer, may be covered by the second thermal conduction layer. Therefore, it is possible to minimize the extent to which the heat transferred along the first thermal conduction layer is transferred to other inadvertent points (e.g., the side part of the liner). Therefore, it is possible to more quickly and effectively heat (melt) the portion of the liner at the target position.

In some implementations, the first thermal conductivity of the first thermal conduction layer may be 500 to 1200 W/mk, a melting point of the first thermal conduction layer may be 500° C. or more, the second thermal conductivity of the second thermal conduction layer may be 0.05 to 0.2 W/mk, and a melting point of the second thermal conduction layer may be 250° C. or more.

In some implementations, one end of the thermal conduction member (one end of the first thermal conduction layer) may be disposed adjacent to an outermost peripheral end of the neck portion and be in contact with a lateral surface of the neck portion.

This is based on the fact that the outermost peripheral end of the neck portion, which is exposed to the outside among all the portions of the boss, is most quickly heated to a highest temperature by the heat applied from the outside. Because the heat of the outermost peripheral end of the neck portion, which is most quickly heated to the highest temperature among the portions of the boss, is transferred to the target position via the thermal conduction member, it is possible to obtain an advantageous effect of more quickly and effectively heating (melting) the portion of the liner at the target position.

In some implementations, the thermal conduction member may include a third thermal conduction layer having third thermal conductivity lower than the first thermal conductivity and provided on an outer surface of the first thermal conduction layer that faces an inner surface of the reinforcement layer.

As described above, the third thermal conduction layer may be provided on the outer surface of the first thermal conduction layer that faces the inner surface of the reinforcement layer, which makes it possible to minimize the extent to which the heat transferred along the first thermal conduction layer is transferred to the reinforcement layer. Therefore, it is possible to obtain an advantageous effect of inhibiting damage to (burst of) the reinforcement layer caused by the heat transferred along the first thermal conduction layer.

In some implementations, the target position may be defined to correspond to a direction in which the target fluid is discharged by the thermally activated pressure relief device.

In some implementations, the pressure vessel may include a guide hole provided in the reinforcement layer while corresponding to the target position.

For example, the guide hole may be provided in the reinforcement layer while corresponding to the target position. Therefore, the discharge direction of the target fluid, which is discharged through the hole provided in the liner when the portion of the liner at the target position is melted, may be guided to a direction toward a lower side of the pressure vessel that is the direction in which the target fluid is discharged by the thermally activated pressure relief device. Therefore, it is possible to obtain an advantageous effect of satisfying the regulations related to the discharge direction of the target fluid (e.g., hydrogen) and improving safety and reliability.

In some implementations, the pressure vessel may include a guide space defined between the reinforcement layer and the liner while corresponding to the target position.

In some implementations, the guide space may be provided between the reinforcement layer and the liner while corresponding to the target position. Therefore, the discharge direction of the target fluid, which is discharged through the hole provided in the liner when the portion of the liner at the target position is melted, may be guided to the direction toward the lower side of the pressure vessel that is the direction in which the target fluid is discharged by the thermally activated pressure relief device. Therefore, it is possible to obtain an advantageous effect of satisfying the regulations related to the discharge direction of the target fluid (e.g., hydrogen) and improving safety and reliability.

DETAILED DESCRIPTION

Figure 1:
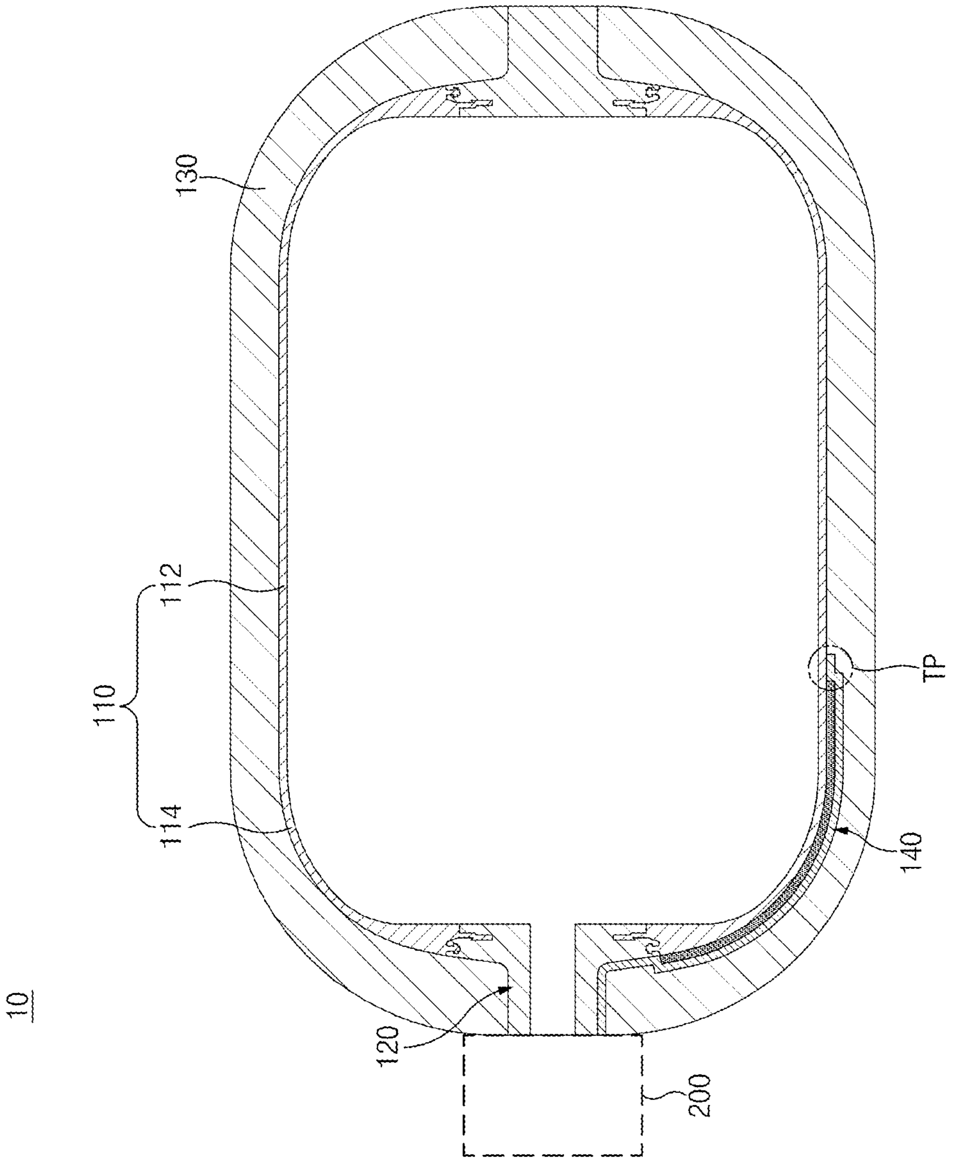
FIG. 1 is a view showing an example of a pressure vessel.

Hereinafter, one or more implementations of the present disclosure will be described in detail with reference to the accompanying drawings.

Referring to FIGS. 1 to 6, a pressure vessel 10 includes: a liner 110 configured to store a target fluid and having bosses 120 provided at ends thereof; a reinforcement layer 130 configured to surround a periphery of the liner 110; and a thermal conduction member 140 disposed between the liner 110 and the reinforcement layer 130 and having one end being in contact with the boss 120, and the other end being in contact with the liner 110 at a preset target position TP, the thermal conduction member 140 being configured to transfer heat applied to the boss 120 to the target position TP.

In some implementations, the pressure vessel 10 may be used to store the target fluid (liquid or gas). The present disclosure is not restricted or limited by the type and property of the fluid to be stored in the pressure vessel 10.

Hereinafter, an example will be described in which the pressure vessel 10 is used as a hydrogen tank for a hydrogen storage system applied to mobility vehicles such as various fuel cell electric vehicles (e.g., passenger vehicles or commercial vehicles), ships, and aircrafts to which a fuel cell stack may be applied.

The liner 110 may be configured as a hollow structure having a storage space therein, and the target fluid (e.g., high-pressure compressed hydrogen) may be stored in the storage space.

The boss 120 is provided at the end of the liner 110 and defines an inlet/outlet port through which hydrogen enters or exits the liner 110 (hydrogen is introduced or discharged). Various types of valve devices are connected to the boss 120.

Hereinafter, an example will be described in which the pressure vessel 10 includes a first boss 120*a* disposed at one end (a left end based on FIG. 4) of the liner 110, and a second boss 120*b* disposed at the other end (a right end based on FIG. 4) of the liner 110, and the inlet/outlet port is provided only in the first boss 120*a*. In some examples, the boss may be disposed only at one end of the liner.

The liner 110 may be variously changed in material in accordance with conditions and design specifications. The present disclosure is not restricted or limited by the material of the liner 110. In particular, the liner 110 may be made of a nonmetallic material such as high-density plastic with excellent restoring force and excellent fatigue resistance.

More specifically, the liner 110 may include a cylinder part 112 having a hollow cylindrical shape, and dome-shaped side parts 114 integrated with the cylinder part 112 at the two opposite ends of the cylinder part 112. The bosses 120 may be provided to define outermost peripheries of the side parts 114, respectively.

The boss 120 may have various structures in accordance with conditions and design specifications. The present disclosure is not restricted or limited by the structure and shape of the boss 120.

In some implementations, the boss 120 may include a neck portion 122 having one end exposed to the outside of the liner 110, and a flange portion 124 connected to the other end of the neck portion 122 and having a larger cross-sectional area than the neck portion 122.

For example, the neck portion 122 may have an approximately hollow cylindrical shape. One end of the neck portion 122 (e.g., a left end of the first boss based on FIG. 1) may be exposed to the outside of the liner 110.

The flange portion 124 may be integrated with the other end of the neck portion 122 and having an approximately circular plate shape having a diameter larger than a diameter of the neck portion 122. The liner 110 may surround a periphery of the flange portion 124.

In some examples, the boss may include only the neck portion without a separate flange portion.

In some implementations, the boss 120 may be made of a material having higher thermal conductivity than a material of the liner 110 and a material of the reinforcement layer 130.

For example, the boss 120 may be made of a metallic material having higher thermal conductivity than the material of the liner 110 and the material of the reinforcement layer 130.

The boss 120 may be made of various types of metal materials in accordance with conditions and design specifications, and the present disclosure is not restricted or limited by the material of the boss 120.

In particular, the boss 120 may be made of an aluminum alloy (e.g., AL6060-T6).

The valve device connected to the boss 120 may be variously changed in type and structure in accordance with conditions and design specifications. The present disclosure is not restricted or limited by the type and structure of the valve device.

In some implementations, the pressure vessel 10 may include a thermally activated pressure relief device (TPRD) 200 connected to the boss 120 and configured to selectively discharge the target fluid to the outside.

For example, the thermally activated pressure relief device (TPRD) 200 may be configured such that a metal fuse in a safety valve is melted by a high temperature in the event of a fire so that a flow path (hydrogen discharge flow path) is opened. In some examples, a thermally activated pressure relief device using a glass bulb-type fuse may be used for the thermally activated pressure relief device.

The reinforcement layer 130 is provided such that the pressure vessel 10 may properly withstand high pressure. The reinforcement layer 130 is configured to surround an entire outer surface of the liner 110.

The reinforcement layer 130 may be made of various materials in accordance with conditions and design specifications. The present disclosure is not restricted or limited by the type and material of the reinforcement layer 130.

For example, the reinforcement layer 130 may include a carbon fiber layer 132 configured to surround the periphery of the liner 110.

The carbon fiber layer 132 may be made by winding the carbon fiber composite material, which is made by impregnating carbon fibers with epoxy, thermosetting resin, and the like, around the outer surface of the liner 110 by using the typical winding device.

The structure of the wound carbon fiber composite material and the method of winding the carbon fiber composite material may be variously changed in accordance with conditions and design specifications. The present disclosure is not limited or restricted by the method of winding the carbon fiber composite material. For example, the carbon fiber layer 132 may be made by winding multiple layers of the carbon fiber composite material around the outer surface of the liner 110 in various patterns (e.g., clockwise winding, counterclockwise winding, oblique winding, etc.).

The carbon fiber composite material wound around the liner 110 may be cured through a subsequent heat treatment process, thereby implementing the carbon fiber layer 132. As an example, the carbon fiber composite material wound around the outer surface of the liner 110 may be cured by being subjected to the heat treatment at a temperature of 150° C. or more for a predetermined time.

In the present disclosure illustrated and described above, the example has been described in which the reinforcement layer 130 includes the carbon fiber layer 132. In some implementations, the reinforcement layer may include a fiberglass layer together with the carbon fiber layer.

Figure 6:
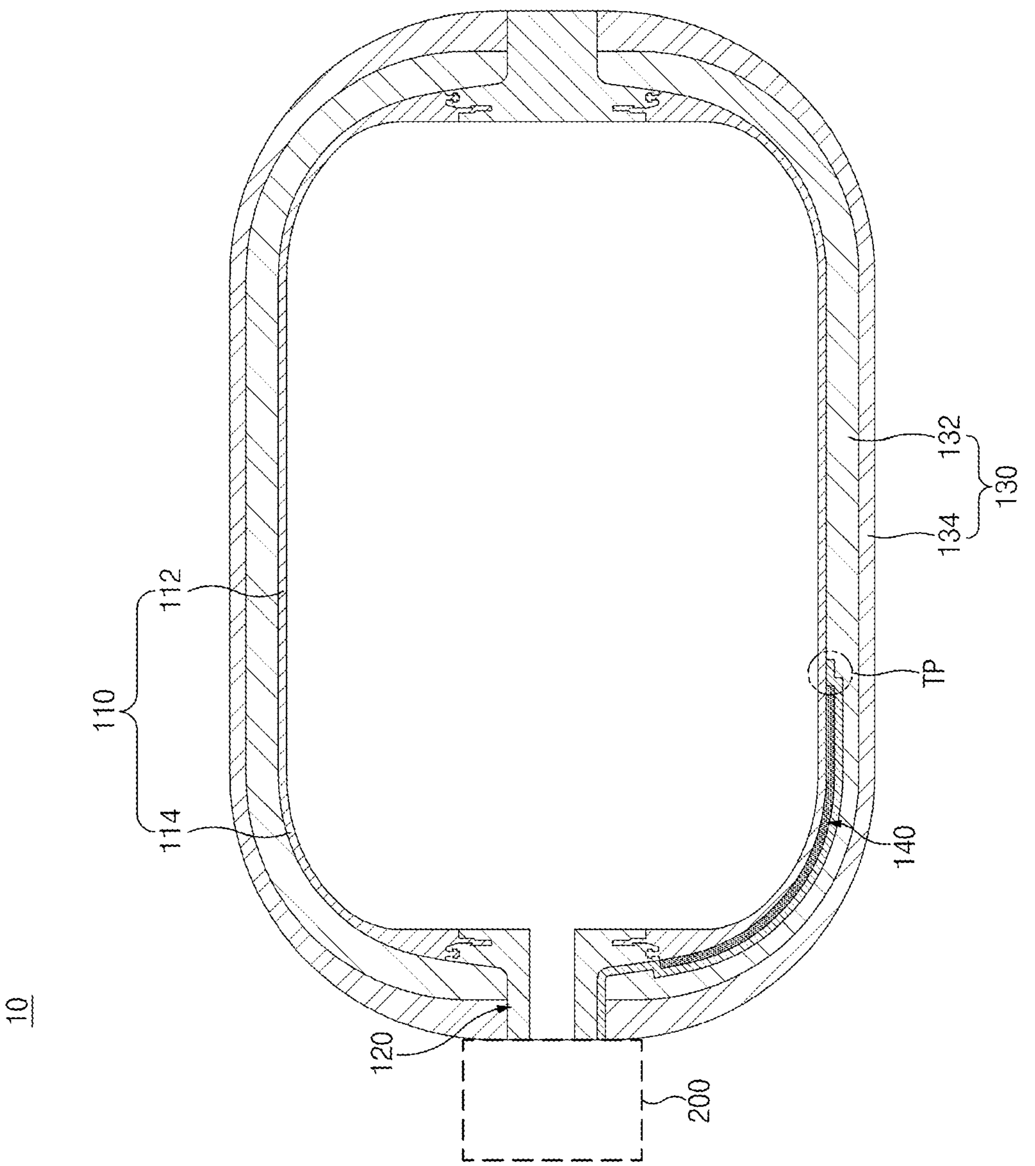
FIG. 6 is a view showing an example of a reinforcement layer of the pressure vessel.

Referring to FIG. 6, in some implementations, the reinforcement layer 130 may include a fiberglass layer 134 configured to surround a periphery of the carbon fiber layer 132.

The fiberglass layer 134 is configured to prevent damage to the pressure vessel 10 caused by external impact (e.g., scratches), corrosion, and the like. The fiberglass layer 16 is configured to surround an entire outer surface of the carbon fiber layer 132.

As an example, the fiberglass layer 134 may be made by winding a fiberglass composite material around the outer surface of the carbon fiber layer 132, the fiberglass composite material being made by impregnating a fiberglass filament with epoxy, thermosetting resin, and the like.

A structure and a method for winding the fiberglass composite material may be variously changed in accordance with conditions and design specifications. The present disclosure is not limited or restricted by the method of winding the fiberglass composite material. As an example, the fiberglass layer 134 may be provided by winding multiple layers of the fiberglass composite material around the outer surface of the carbon fiber layer 132 in various patterns (e.g., clockwise winding, counterclockwise winding, oblique winding, etc.).

The fiberglass composite material is cured through a subsequent heat treatment process, thereby implementing the fiberglass layer 134. As an example, the fiberglass composite material may be cured by being subjected to the heat treatment at a temperature of 150° C. or more for a predetermined time.

The thermal conduction member 140 serves to transfer heat, which is applied to the boss 120 in the event of a fire, to the target position TP so that a portion of the liner 110 at the target position TP on the liner 110 is locally melted to define a hole through which hydrogen may be forcibly discharged.

More specifically, the thermal conduction member 140 serves to transfer heat, which is applied to the boss 120 in the event of a fire, to the target position TP so that the portion of the liner 110 at the target position TP on the liner 110 is locally melted to define the hole through which hydrogen may be forcibly discharged.

As described above, the hole, through which hydrogen may be discharged, may be provided by locally melting the portion of the liner 110 at the target position TP by using the heat applied to the boss 120 when a temperature of the pressure vessel 10 is raised. Therefore, it is possible to obtain an advantageous effect of preventing a burst of the pressure vessel 10 and reducing a risk of occurrence of a safety accident caused by the burst of the pressure vessel 10.

In some examples, the hydrogen may be forcibly discharged from the pressure vessel 10 even though the thermally activated pressure relief device (TPRD) 200 is broken down or erroneously operated. Therefore, it is possible to obtain an advantageous effect of preventing the reinforcement layer 130 from bursting before a temperature of the liner 110 is raised. Further, it is possible to obtain an advantageous effect of reducing a risk of occurrence of a safety accident caused by the burst of the reinforcement layer 130.

In some implementations, the thermal conduction member 140 may be provided between the liner 110 and the reinforcement layer 130. One end (e.g., a left end based on FIG. 2) of the thermal conduction member 140 may be in contact with the boss 120, and the other end (e.g., a right end based on FIG. 2) of the thermal conduction member 140 may be in contact with the liner 110 at the preset target position TP. The heat applied to the boss 120 may be transferred to the target position TP along a route (see HF in FIG. 3) defined along the thermal conduction member 140.

In some examples, the thermal conduction member 140 may be attached or coupled, in advance, to the outer surface of the liner 110 before the reinforcement layer 130 is provided on the periphery of the liner 110. The reinforcement layer 130 may be configured to surround the outer surface of the thermal conduction member 140 and the outer surface of the liner 110.

For example, the thermal conduction member 140 may be attached to the surface of the liner 110 by a bonding agent or tape.

The target position TP at which the other end of the thermal conduction member 140 is in contact with the liner 110 may be variously changed in accordance with conditions and design specifications. The present disclosure is not restricted or limited by the position condition of the target position TP.

In some implementations, the target position TP may be defined on the cylinder part 112 of the liner 110.

In this case, the configuration in which the target position TP is defined on the cylinder part 112 may be understood as a configuration in which a point with which the other end of the thermal conduction member 140 is in contact (a point at which the liner is melted by heat transferred through the thermal conduction member) is defined on the cylinder part 112.

This is to minimize the extent to which the boss 120 is strongly separated by the heat transferred from the boss 120 to the liner 110 through the thermal conduction member 140 in the event of a fire. That is, the target position TP may be defined on the side part 114 of the liner 110 instead of the cylinder part 112 of the liner 110. However, there may occur a problem in that coupling strength of the boss 120 connected to the side part 114 is difficult to stably maintain when the side part 114 adjacent to the boss 120 is melted. Further, there may occur problems in that as the coupling strength of the boss 120 is decreased, the boss 120 is pulled off and strongly separated from the liner 110 without withstanding an internal pressure of the liner 110.

In some implementations, the target position TP may be defined on the cylinder part 112 of the liner 110, in other words, the point of the liner 110, which is to be melted by the thermal conduction member 140, may be defined on the cylinder part 112. Therefore, it is possible to obtain an advantageous effect of stably maintaining the coupling strength of the boss 120 and inhibiting the separation of the boss 120.

The target position TP may be variously changed in number in accordance with conditions and design specifications. The present disclosure is not restricted or limited by the number of target positions TP.

Figure 4:
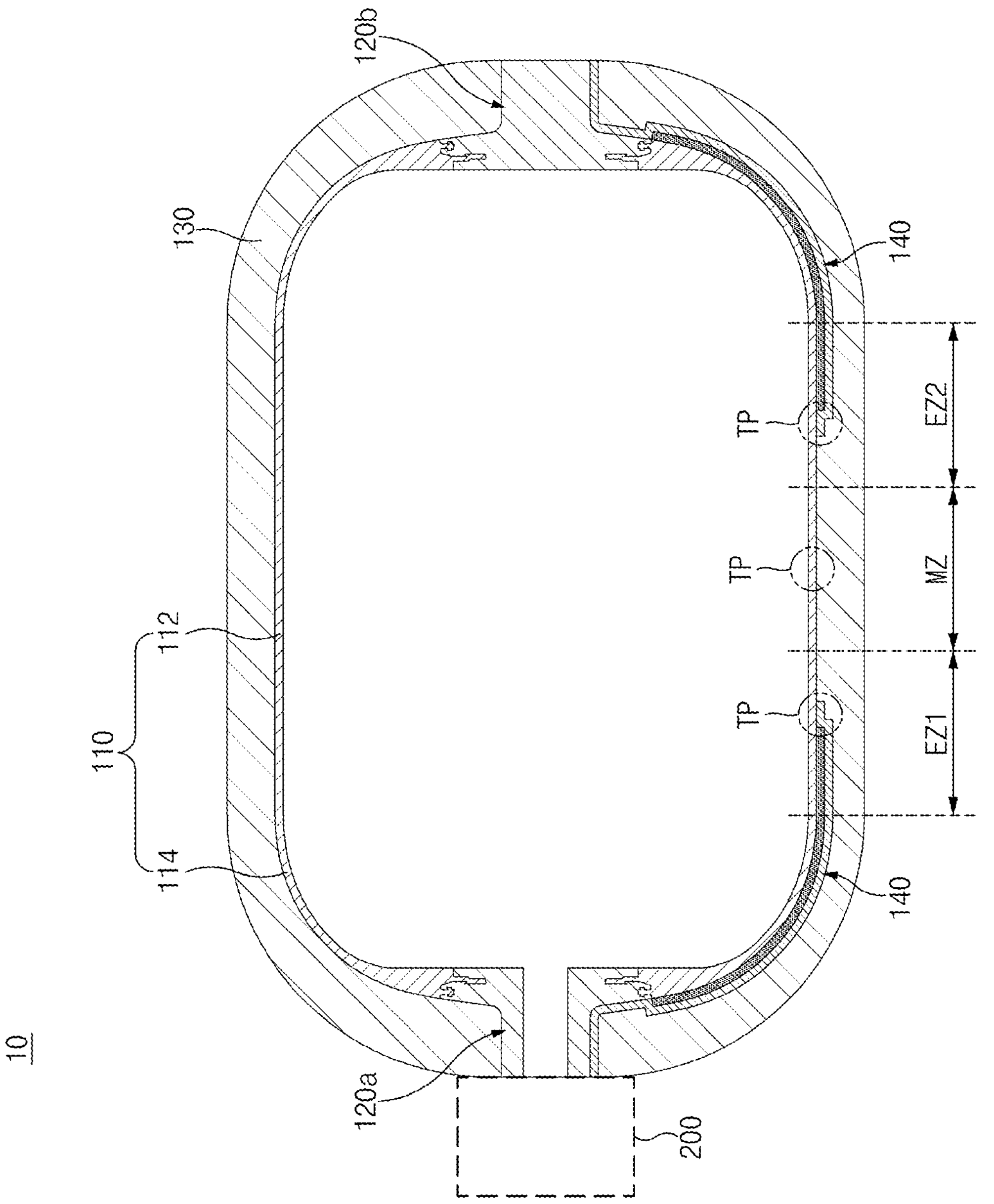
FIG. 4 is a view showing an example of a target position defined at the pressure vessel.

Referring to FIG. 4, in some implementations, the target position TP may be defined in at least any one of a central region MZ of the cylinder part 112 and two opposite edge regions EZ1 and EZ2 of the cylinder part 112.

For example, the target positions TP may be respectively defined in the central region MZ of the cylinder part 112, the first edge region EZ1 of the cylinder part 112 disposed adjacent to the first boss 120*a*, and the second edge region EZ2 of the cylinder part 112 disposed adjacent to the second boss 120*b*.

For example, the thermal conduction member 140 being in contact with the first boss 120*a* may be connected to the target positions TP respectively defined in the central region MZ and the first edge region EZ1. The thermal conduction member 140 being in contact with the second boss 120*b* may be connected to the target position TP defined in the second edge region EZ2.

In some examples, the target position may be defined only in the central region, or the target position may be defined only in the edge region of the cylinder part.

In some implementations, the thermal conduction member 140 may be configured to transfer heat applied to the boss 120 to the cylinder part 112 of the liner 110. For example, one end of the thermal conduction member may be connected to the boss 120, and the other end of the thermal conduction member 140 may be in contact with the cylinder part 112 through the side part 114.

In some implementations, the thermal conduction member 140 may be provided along a shortest route that connects the boss 120 and the target position TP. Because the thermal conduction member 140 is provided along the shortest route that connects the boss 120 and the target position TP as described above, it is possible to maximize the thermal conduction efficiency and heat transfer performance implemented by the thermal conduction member 140 and more quickly melt the portion of the liner at the target position TP.

Various thermally conductive members capable of transferring heat applied to the boss 120 to the target position TP on the liner 110 (e.g., the cylinder part of the liner) may be used as the thermal conduction member 140. The present disclosure is not restricted or limited by the type and structure of the thermal conduction member 140.

In some implementations, the thermal conduction member 140 may be made of a material having higher thermal conductivity than a material of the reinforcement layer 130.

In some implementations, the thermal conduction member 140 may include: a first thermal conduction layer 142 having first thermal conductivity and having one end being in contact with the boss 120 and the other end being in contact with the liner 110 at the target position TP; and a second thermal conduction layer 144 having second thermal conductivity lower than the first thermal conductivity and interposed between the liner 110 and the first thermal conduction layer 142.

The first thermal conduction layer 142 is configured to substantially transfer heat, which is applied to the boss 120 from the outside of the boss 120, to the liner 110.

Various members having high thermal conductivity may be used as the first thermal conduction layer 142. The present disclosure is not restricted or limited by the type and structure of the first thermal conduction layer 142.

For example, the first thermal conduction layer 142 may be provided in the form of a band or film having a small thickness. The first thermal conduction layer 142 may be variously changed in width and thickness in accordance with conditions and design specifications. The present disclosure is not restricted or limited by the width and thickness of the first thermal conduction layer 142. Alternatively, the first thermal conduction layer may have a wire shape or other shapes.

The first thermal conduction layer 142 may be made of various materials having high thermal conductivity. The present disclosure is not restricted or limited by the material and properties of the first thermal conduction layer 142.

In some implementations, the first thermal conductivity of the first thermal conduction layer 142 may be 500 to 1200 W/mk, and a melting point of the first thermal conduction layer 142 may be 500° C. or more.

The second thermal conduction layer 144 is configured to minimize the extent to which the heat, which is transferred to the target position TP (e.g., the cylinder part of the liner) of the liner 110 along the first thermal conduction layer 142, is transferred to the side part 114 of the liner 110.

Various members having the second thermal conductivity lower than the first thermal conductivity may be used as the second thermal conduction layer 144. The present disclosure is not restricted or limited by the type and structure of the second thermal conduction layer 144.

For example, the second thermal conduction layer 144 may be provided in the form of a band or film having a small thickness. In some examples, the second thermal conduction layer may have a wire shape or other shapes. Alternatively, the second thermal conduction layer may be made by applying resin having low thermal conductivity.

The second thermal conduction layer 144 may be made of various materials having low thermal conductivity. The present disclosure is not restricted or limited by the material and properties of the second thermal conduction layer 144.

In some implementations, the second thermal conductivity of the second thermal conduction layer 144 may be 0.05 to 0.2 W/mk, a melting point of the second thermal conduction layer 144 may be 250° C. or more.

In particular, the second thermal conduction layer 144 may be provided on an inner surface of the first thermal conduction layer 142 that faces the outer surface of the liner 110, such that the second thermal conduction layer 144 corresponds to a portion between one end of the first thermal conduction layer 142, which is in contact with the boss 120, and the other end of the first thermal conduction layer 142 that is in contact with the liner 110.

That is, the second thermal conduction layer 144 may be provided between one end and the other end of the first thermal conduction layer 142 so as to correspond to a section between the boss 120 and the target position TP among all the sections of the first thermal conduction layer 142.

As described above, all the remaining portions of the first thermal conduction layer 142, except for one end and the other end of the first thermal conduction layer 142, may be covered by the second thermal conduction layer 144. In other words, the second thermal conduction layer 144 may prevent the first thermal conduction layer 142 and the side part 114 of the liner 110 from being in contact with each other. Therefore, it is possible to minimize the extent to which the heat transferred along the first thermal conduction layer 142 is transferred to other inadvertent points (e.g., the side part of the liner). Therefore, it is possible to more quickly and effectively heat (melt) the portion of the liner at the target position TP.

In some implementations, one end of the thermal conduction member 140 (one end of the first thermal conduction layer 142) may be disposed adjacent to an outermost peripheral end of the neck portion 122 and be in contact with a lateral surface of the neck portion 122.

In this case, the outermost peripheral end of the neck portion 122 may be understood as a portion of the neck portion 122 exposed to the outside of the liner 110 and disposed farthest from the liner 110.

This is based on the fact that the outermost peripheral end of the neck portion 122, which is exposed to the outside among all the portions of the boss 120, is most quickly heated to a highest temperature by the heat applied from the outside (e.g., heat generated by a fire). Because the heat of the outermost peripheral end of the neck portion 122, which is most quickly heated to the highest temperature among the portions of the boss 120, is transferred to the target position TP via the thermal conduction member 140, it is possible to obtain an advantageous effect of more quickly and effectively heating (melting) the portion of the liner at the target position TP.

In the present disclosure, as illustrated and described above, the example has been described in which the reinforcement layer 130 is configured to cover the outermost peripheral end of the thermal conduction member 140. In some examples, the outermost peripheral end of the thermal conduction member may be exposed to the outside of the reinforcement layer.

Figure 5:
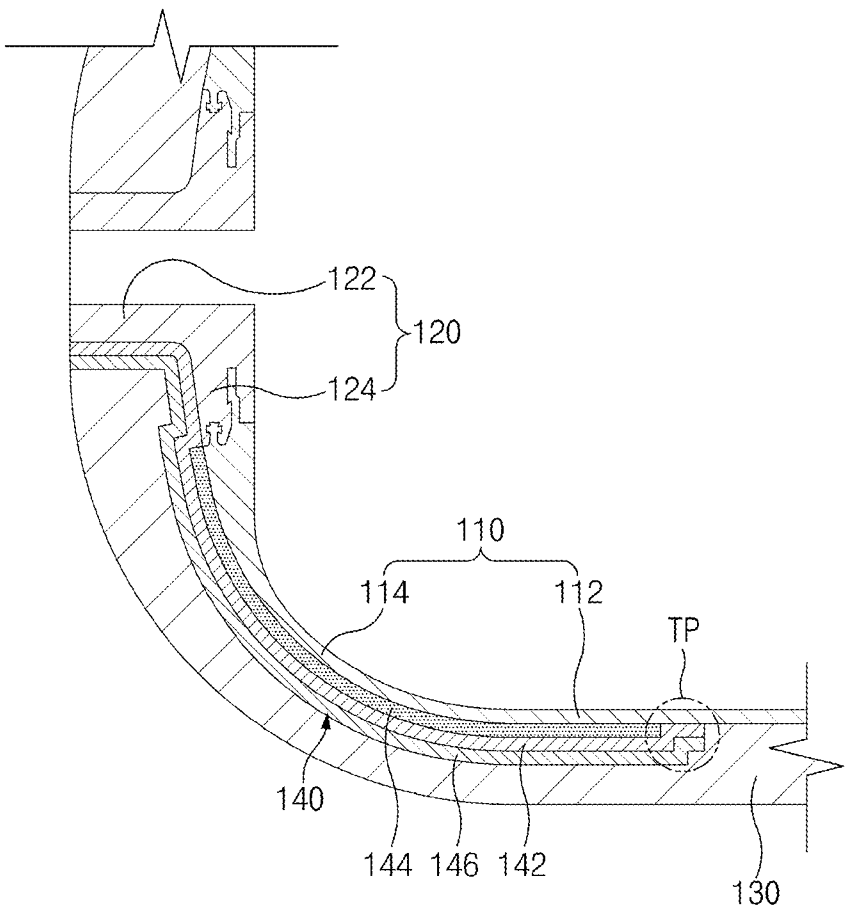
FIG. 5 is a view showing an example of the thermal conduction member of the pressure vessel.

Referring to FIG. 5, in some implementations, the thermal conduction member 140 may include a third thermal conduction layer 146 having third thermal conductivity lower than the first thermal conductivity and provided on an outer surface of the first thermal conduction layer 142 that faces an inner surface of the reinforcement layer 130.

Various members having the third thermal conductivity lower than the first thermal conductivity may be used as the third thermal conduction layer 146. The present disclosure is not restricted or limited by the type and structure of the third thermal conduction layer 146.

For example, the third thermal conduction layer 146 may be provided in the form of a band or film having a small thickness. In some examples, the third thermal conduction layer may have a wire shape or other shapes. Alternatively, the third thermal conduction layer may be made by applying resin having low thermal conductivity.

In some implementations, the third thermal conduction layer 146 may be configured to cover the entire outer surface of the first thermal conduction layer 142 that faces the inner surface of the reinforcement layer 130. Alternatively, the third thermal conduction layer may be configured to partially cover the outer surface of the first thermal conduction layer that faces the inner surface of the reinforcement layer.

The third thermal conduction layer 146 may be made of various materials having low thermal conductivity. The present disclosure is not restricted or limited by the material and properties of the third thermal conduction layer 146.

For example, the third thermal conduction layer 146 may have identical or similar properties to the second thermal conduction layer 144 (e.g., the third thermal conductivity is 0.05 to 0.2 W/mk, and a melting point of the third thermal conduction layer 146 is 250° C. or more).

As described above, the third thermal conduction layer 146 may be provided on the outer surface of the first thermal conduction layer 142 that faces the inner surface of the reinforcement layer 130, which makes it possible to minimize the extent to which the heat transferred along the first thermal conduction layer 142 is transferred to the reinforcement layer 130. Therefore, it is possible to obtain an advantageous effect of inhibiting damage to (burst of) the reinforcement layer 130 caused by the heat transferred along the first thermal conduction layer 142.

Figure 2:
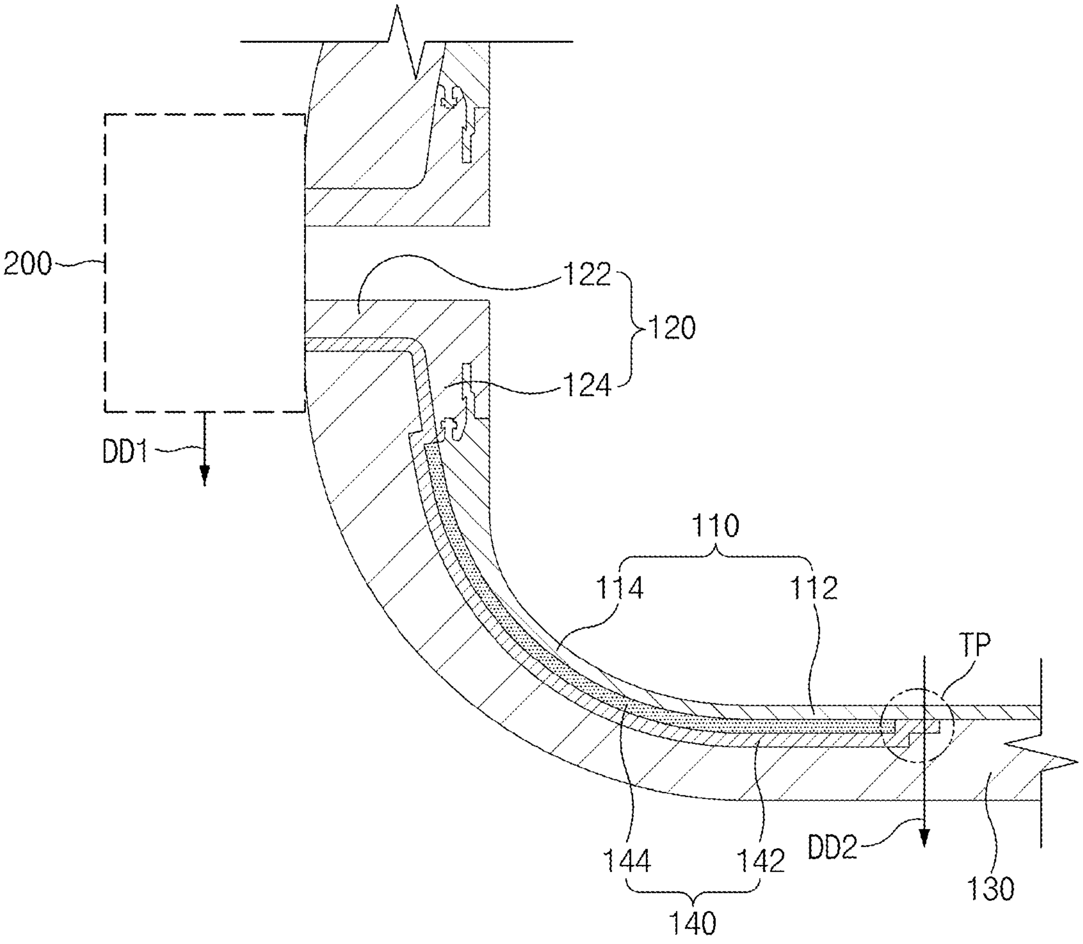
FIG. 2 is a view showing an example of a thermal conduction member of the pressure vessel.
Figure 3:
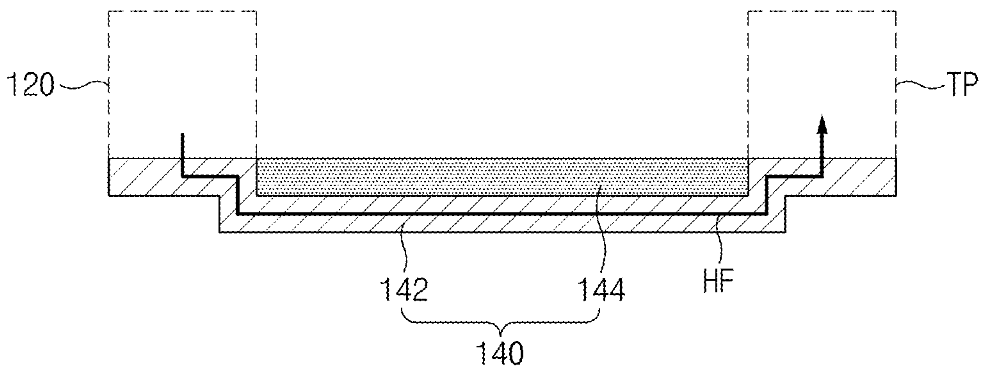
FIG. 3 is a view showing an example of a route of a movement of heat implemented by the thermal conduction member of the pressure vessel.

Referring to FIG. 2, in some implementations, the target position TP may be defined to correspond to a direction DD1 in which the target fluid is discharged by the thermally activated pressure relief device 200.

For example, the direction DD1 in which the target fluid (e.g., hydrogen) is discharged by the thermally activated pressure relief device 200 may be defined to be directed toward the outside (e.g., the ground surface) of a residential space for a passenger in a mobility vehicle. Further, the target position TP may also be defined to be directed toward the outside (e.g., the ground surface) of the residential space for the passenger in the mobility vehicle. For example, the target position TP may be defined on a lower portion of the pressure vessel 10 (a lower portion of the liner) based on the gravitational direction based on FIG. 2.

In some implementations, the pressure vessel 10 may include a guide hole provided in the reinforcement layer 130 while corresponding to the target position TP.

For example, the guide hole may be provided in the lower portion of the pressure vessel 10 while corresponding to the target position TP.

The guide hole may have various structures capable of guiding a discharge direction of the target fluid discharged through the hole provided in the liner 110 when the portion of the liner at the target position TP is melted. The present disclosure is not restricted or limited by the structure and shape of the guide hole. For example, the guide hole may have an approximately circular cross-sectional shape.

In some implementations, the guide hole may be provided in the reinforcement layer 130 while corresponding to the target position TP. Therefore, the discharge direction (see DD2 in FIG. 2) of the target fluid, which is discharged through the hole provided in the liner 110 when the portion of the liner at the target position TP is melted, may be guided to a direction toward a lower side of the pressure vessel 10 that is the direction DD1 in which the target fluid is discharged by the thermally activated pressure relief device 200. Therefore, it is possible to obtain an advantageous effect of satisfying the regulations related to the discharge direction of the target fluid (e.g., hydrogen) and improving safety and reliability.

In some implementations, the pressure vessel 10 may include a guide space (empty space) defined between the reinforcement layer 130 and the liner 110 while corresponding to the target position TP.

For example, the guide space may be defined between the reinforcement layer 130 and the liner 110 and positioned in the lower portion of the pressure vessel 10 while corresponding to the target position TP.

The guide space may have various structures capable of guiding the discharge direction of the target fluid discharged through the hole provided in the liner 110 when the portion of the liner at the target position TP is melted. The present disclosure is not restricted or limited by the structure and shape of the guide space. For example, the guide space may have an approximately circular cross-sectional shape.

In some implementations, the guide space may be provided between the reinforcement layer 130 and the liner 110 while corresponding to the target position TP. Therefore, the discharge direction (see DD2 in FIG. 2) of the target fluid, which is discharged through the hole provided in the liner 110 when the portion of the liner at the target position TP is melted, may be guided to the direction toward the lower side of the pressure vessel 10 that is the direction DD1 in which the target fluid is discharged by the thermally activated pressure relief device 200. Therefore, it is possible to obtain an advantageous effect of satisfying the regulations related to the discharge direction of the target fluid (e.g., hydrogen) and improving safety and reliability.

As described above, it is possible to obtain an advantageous effect of improving safety and reliability.

In some implementations, the portion of the liner at the target position may be locally melted by using heat applied to the boss when the temperature of the pressure vessel is raised, such that the hole through which hydrogen may be forcibly discharged may be provided before the reinforcement layer bursts. Therefore, it is possible to improve safety and reliability.

In some implementations, it is possible to prevent a burst of the pressure vessel by forcibly discharging hydrogen from the pressure vessel even though the thermally activated pressure relief device (TPRD) is broken down or erroneously operated.

In some examples, it is possible to obtain an advantageous effect of reducing a risk of occurrence of a safety accident caused by a burst of the pressure vessel.

While the implementations have been described above, the implementations are just illustrative and not intended to limit the present disclosure. It can be appreciated by those skilled in the art that various modifications and applications, which are not described above, may be made to the present implementation without departing from the intrinsic features of the present implementation. For example, the respective constituent elements specifically described in the implementations may be modified and then carried out. Further, it should be interpreted that the differences related to the modifications and applications are included in the scope of the present disclosure defined by the appended claims.

What is claimed is:

1. A pressure vessel comprising:

a liner configured to store a target fluid, the liner including a boss disposed at an end portion of the liner;

a reinforcement layer that surrounds a periphery of the liner; and a thermal conduction member disposed between the liner and the reinforcement layer, the thermal conduction member having (i) a first end in contact with the boss and (ii) a second end in contact with a target position defined at the liner, wherein the thermal conduction member is configured to transfer heat from the boss to the target position, wherein the thermal conduction member comprises:

a first thermal conduction layer having a first thermal conductivity, the first thermal conduction layer having (i) the first end in contact with the boss, (ii) the second end in contact with the target position, (iii) an inner surface that faces an outer surface of the liner, and (iv) an outer surface that faces an inner surface of the reinforcement layer, a second thermal conduction layer disposed at the inner surface of the first thermal conduction layer facing the outer surface of the liner, the second thermal conduction layer having a second thermal conductivity less than the first thermal conductivity, wherein the second thermal conduction layer is disposed at the inner surface of the first thermal conduction layer in a range between the first end and the second end of the first thermal conduction layer, and a third thermal conduction layer disposed at the outer surface of the first thermal conduction layer facing the inner surface of the reinforcement layer, the third thermal conduction layer having a third thermal conductivity less than the first thermal conductivity, wherein the first thermal conduction layer is disposed between the second thermal conduction layer and the third thermal conduction layer, wherein the pressure vessel further comprises a thermally activated pressure relief device (TPRD) connected to the boss and configured to selectively discharge the target fluid through the boss to an outside of the liner along a discharge direction, wherein the liner is configured to discharge the target fluid through the target position along a direction corresponding to the discharge direction, wherein the thermally activated pressure relief device is configured such that a metal fuse in a safety valve is melted by a temperature in an event of fire to thereby open a flow path for discharging the target fluid from the pressure vessel, wherein the boss comprises:

a neck portion having a first end exposed to an outside of the liner, and a flange portion connected to a second end of the neck portion, wherein a cross-sectional area of the flange portion is greater than a cross-sectional area of the neck portion, wherein the first end of the thermal conduction member is in contact with a lateral surface of the neck portion and disposed adjacent to an outermost peripheral end of the neck portion, and wherein the first end of the thermal conduction member defines a circumferential surface that extends along the lateral surface of the neck portion to the outermost peripheral end of the neck portion and that is in surface contact with the lateral surface of the neck portion.

2. The pressure vessel of claim 1, wherein the liner comprises:

a cylinder part; and a side part that has a dome-shape and is provided at one of two opposite ends of the cylinder part, and wherein the boss is connected to the side part.

3. The pressure vessel of claim 2, wherein the target position is defined at the cylinder part, and wherein the second end of the thermal conduction member is in contact with the cylinder part through the side part.

4. The pressure vessel of claim 3, wherein the target position is defined at least one of a central region of the cylinder part or two opposite edge regions of the cylinder part.

5. The pressure vessel of claim 1, wherein a thermal conductivity of the boss is greater than thermal conductivities of the liner and the reinforcement layer.

6. The pressure vessel of claim 1, wherein the first thermal conductivity is 500 to 1200 W/mk, and a melting point of the first thermal conduction layer is 500° C. or more, and wherein the second thermal conductivity is 0.05 to 0.2 W/mk, and a melting point of the second thermal conduction layer is 250° C. or more.

7. The pressure vessel of claim 1, wherein the boss is one of a plurality of bosses provided at the liner, the plurality of bosses comprising (i) a first boss provided at a first end of the liner and (ii) a second boss provided at a second end of the liner.

8. The pressure vessel of claim 1, wherein the reinforcement layer comprises a carbon fiber layer that surrounds the periphery of the liner.

9. The pressure vessel of claim 8, wherein the reinforcement layer comprises a fiberglass layer that surrounds a periphery of the carbon fiber layer.

10. The pressure vessel of claim 1, wherein the target position is defined at a lower portion of the liner based on a gravitational direction.

11. The pressure vessel of claim 1, wherein a thermal conductivity of the thermal conduction member is greater than a thermal conductivity of the reinforcement layer.

12. The pressure vessel of claim 1, wherein the thermal conduction member defines a shortest route that connects the boss and the target position.

13. The pressure vessel of claim 1, wherein the thermally activated pressure relief device is coupled to the boss in an axial direction of the pressure vessel and configured to discharge the target fluid in the discharge direction that is orthogonal to the axial direction of the pressure vessel.

14. The pressure vessel of claim 1, wherein the target fluid is hydrogen.

15. The pressure vessel of claim 1, wherein the thermally activated pressure relief device is attached to the neck portion of the boss and covers the first end of the neck portion.

16. The pressure vessel of claim 1, wherein distal ends of the first thermal conduction layer and the third thermal conduction layer are disposed at a position corresponding to the outermost peripheral end of the neck portion.

17. The pressure vessel of claim 1, wherein the first thermal conduction layer defines the circumferential surface that is in surface contact with the lateral surface of the neck portion.

* * * * *